United States Patent
Kameda et al.

(10) Patent No.: US 10,654,332 B2
(45) Date of Patent: May 19, 2020

(54) AUTOMATIC TILTING VEHICLE

(71) Applicant: TOYOTA JIDOSHA KABUSHIKI KAISHA, Toyota-shi, Aichi (JP)

(72) Inventors: Yoshikazu Kameda, Gotemba (JP);
Takahito Ishino, Susono (JP);
Hirotaka Kamano, Susono (JP);
Osamu Yasuike, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 15/821,427

(22) Filed: Nov. 22, 2017

(65) Prior Publication Data

US 2018/0147908 A1    May 31, 2018

(30) Foreign Application Priority Data

Nov. 25, 2016    (JP) .................. 2016-228795

(51) Int. Cl.
*B60G 17/016* (2006.01)
*B60G 17/018* (2006.01)
(Continued)

(52) U.S. Cl.
CPC ..... *B60G 17/0162* (2013.01); *B60G 17/0182* (2013.01); *B60G 17/0195* (2013.01);
(Continued)

(58) Field of Classification Search
CPC ............ B60G 17/0162; B60G 17/0182; B60G 17/0195; B60G 2202/42; B60G 2204/419; B60G 2300/122; B60G 2300/45; B60G 2400/0511; B60G 2400/204; B60G 2400/302; B60G 2400/34; B60G 2400/41; B60G 2400/63; B60G 2401/28; B60G 2800/012; B60G 2800/24; B60G 2800/70; B60G 2800/916; B62D 61/065
See application file for complete search history.

(56) References Cited

U.S. PATENT DOCUMENTS 8,483,924 B2 * 7/2013 Obuchi .................. B60W 40/11
                                                                701/72
9,845,129 B2 * 12/2017 Simon .................. B60G 21/055
(Continued)

FOREIGN PATENT DOCUMENTS

JP     2012-081784 A     4/2012
JP     2013-022993 A     2/2013
(Continued)

*Primary Examiner* — Rachid Bendidi
(74) *Attorney, Agent, or Firm* — Oliff PLC

(57) ABSTRACT

An automatic tilting vehicle comprises left and right front wheels and a rear wheel. A control unit controls a vehicle tilting device so that the tilt angle of the vehicle becomes the target tilt angle. The control device is configured to swingingly vibrates the vehicle in the lateral direction by tilting the vehicle by the vehicle tilting device, to estimate a height of the center of gravity of the vehicle based on a resonance period of swinging vibration of the vehicle, and to correct the target tilt angle such that a perpendicular passing through the estimated center of gravity passes within a range of a triangle formed by connecting grounding points of the left and right front wheels and a grounding point of the rear wheel.

2 Claims, 7 Drawing Sheets

(51) Int. Cl.
  *B60G 17/0195* (2006.01)
  *B62D 61/06* (2006.01)
(52) U.S. Cl.
  CPC .... *B60G 2202/42* (2013.01); *B60G 2204/419* (2013.01); *B60G 2300/122* (2013.01); *B60G 2300/45* (2013.01); *B60G 2400/0511* (2013.01); *B60G 2400/204* (2013.01); *B60G 2400/302* (2013.01); *B60G 2400/34* (2013.01); *B60G 2400/41* (2013.01); *B60G 2400/63* (2013.01); *B60G 2401/28* (2013.01); *B60G 2800/012* (2013.01); *B60G 2800/24* (2013.01); *B60G 2800/70* (2013.01); *B60G 2800/916* (2013.01); *B62D 61/065* (2013.01)

(56) References Cited

U.S. PATENT DOCUMENTS

| | | | | |
|---|---|---|---|---|
| 2010/0114420 | A1* | 5/2010 | Doi | B60N 2/0244 701/31.4 |
| 2012/0098225 | A1* | 4/2012 | Lucas | B60G 3/20 280/124.103 |
| 2012/0109485 | A1 | 5/2012 | Obuchi | |
| 2013/0193656 | A1* | 8/2013 | Itoh | B62K 5/05 280/5.509 |
| 2014/0312580 | A1* | 10/2014 | Gale | B60G 21/073 280/5.509 |
| 2018/0134336 | A1* | 5/2018 | Yoshino | B62K 5/05 |
| 2018/0147908 | A1* | 5/2018 | Kameda | B60G 17/0182 |
| 2018/0264905 | A1* | 9/2018 | Kimura | B60G 17/0162 |
| 2018/0265157 | A1* | 9/2018 | Hara | B62K 25/08 |
| 2018/0265158 | A1* | 9/2018 | Hara | B62K 5/027 |
| 2018/0334001 | A1* | 11/2018 | Kato | B60G 3/20 |

FOREIGN PATENT DOCUMENTS

| | | |
|---|---|---|
| JP | 2013-244763 A | 12/2013 |
| WO | 2011/004459 A1 | 1/2011 |

* cited by examiner

AUTOMATIC TILTING VEHICLE

CROSS-REFERENCE TO RELATED APPLICATION

The disclosure of Japanese Patent Application NO. JP2016-228795 filed on Nov. 25, 2016 is incorporated by reference in its entirety.

BACKGROUND

1. Technical Field

The present disclosure relates to an automatic tilting vehicle that automatically tilts (self inclines) to the inside of a turn when turning.

2. Description of the Related Art

The automatic tilting vehicle has a vehicle tilting device, and the vehicle is automatically tilted to the inner side of a turn by the vehicle tilting device at the time of turning. For example, Japanese Patent Application Laid-Open Publication No. 2013-244763 describes an automatic tilting vehicle that includes a pair of left and right wheels spaced laterally, a swing type vehicle tilting device, and a control unit that controls the vehicle tilting device, and the pair of wheels are rotatably supported by corresponding carriers. The vehicle tilting device includes a swing member swingable about a swing axis extending in a longitudinal direction of the vehicle, an actuator that swings the swing member about the swing axis, and a pair of tie rods pivotally attached to the swing member and the corresponding carriers.

When the swing member swings about the swing axis, the pair of tie rods vertically move in mutually opposite directions, so that the right and left wheels move up and down in opposite directions with respect to a vehicle body, whereby the vehicle inclines in the lateral direction. The control unit calculates a target tilt angle of the vehicle for stably running the vehicle based on a steering operation amount of a driver and a vehicle speed and controls a swing angle of the swing member by the actuator so as to tilt the vehicle so that a tilt angle of the vehicle conforms to the target tilt angle. Typically, a target tilt angle of a vehicle is calculated to be an angle at which a resultant force of the gravity and a turning lateral force acting on a center of gravity of the vehicle acts toward the midpoint between grounding points of the left and right front wheels as seen in the longitudinal direction of the vehicle.

SUMMARY

In an automatic tilting vehicle, it is necessary that even if the vehicle stops while the tilt angle of the vehicle is controlled to a target tilt angle, the vehicle does not overturn due to an excessive tilt angle of the vehicle. Therefore, it has already been proposed to limit a target tilt angle so that a perpendicular passing through the center of gravity of the vehicle passes within a triangular range that is formed by connecting grounding points of the front two wheels and the rear wheels under a premise that the center of gravity of the vehicle is located at a preset height determined by a specification of the vehicle at the center in the lateral direction.

However, even if a target tilt angle is the same, when a height of the preset center of gravity is different from a height of an actual center of gravity, it is incorrectly determined whether or not a perpendicular passing through the center of gravity of the vehicle passes within the triangular range, so that the limitation of the target tilt angle may be inappropriate. For example, in a situation where a perpendicular passing through an actual center of gravity of the vehicle passes outside the triangular range, when a height of the preset center of gravity is smaller than an actual height, it may incorrectly be determined that the perpendicular passes within the triangular range. In this case, despite that a target tilt angle should be limited, it is not limited. Conversely, in a situation where a perpendicular passing through the center of gravity of the actual vehicle passes within the triangular range, when the height of the preset center of gravity is larger than an actual height, it may incorrectly be determined that a perpendicular passes outside the triangular range. In this case, despite that a target tilt angle should not be limited, it is unnecessarily limited.

International Publication No. 2011/004459 describes a vehicle control device in which a height of a center of gravity of a vehicle body (a sprung member) including occupants and the like is estimated based on a pitch angle and a roll angle of a vehicle. However, with the control device described in the publication, it is impossible to estimate a height of a center of gravity of the entire vehicle, and a height of a center of gravity cannot be estimated unless the vehicle is in a traveling state where pitch and roll of the vehicle body are generated. Therefore, even if a height of the center of gravity of the vehicle is estimated on the basis of a height of the center of gravity of the vehicle body estimated by the control device described in the publication, a target tilt angle of the vehicle cannot be limited based on the estimated height of the center of gravity of the vehicle from a time point when the vehicle starts traveling.

The present disclosure provides an automatic tilting vehicle equipped with a vehicle tilting device, which is improved to estimate a height of a center of gravity of the vehicle in a situation where the vehicle is not running and to limit a target tilt angle of the vehicle based on the estimated height of the center of the gravity height from a time point when the vehicle starts traveling.

According to the present disclosure, there is provided an automatic tilting vehicle that comprises left and right front wheels, a rear wheel, a vehicle body, a vehicle tilting device that is configured to tilt the vehicle in a lateral direction, a detection device that detects a tilt angle of the vehicle and a control device configured to control the vehicle tilting device; wherein the left and right front wheels and the vehicle tilting device are suspended from the vehicle body by one front wheel suspension and the rear wheel is suspended from the vehicle body by a rear wheel suspension; the control device is configured to calculate a target tilt angle of the vehicle to a turning inner side so that a resultant force of the gravity and a centrifugal force acting on a center of gravity when turning is directed to a predetermined position between grounding points of the left and right front wheels as seen in the longitudinal direction of the vehicle and to control the vehicle tilting device so that a tilt angle of the vehicle conforms to the target tilt angle.

The control device is configured to tilt the vehicle in a lateral direction by the vehicle tilting device, to swingingly vibrate the vehicle in the lateral direction by tilting the vehicle by the vehicle tilting device and releasing the tilting of the vehicle when the vehicle is not traveling, to obtain a resonance period of swinging vibration of the vehicle based on a change in the tilt angle of the vehicle detected by the detection device, and to estimate a height of the center of gravity of the vehicle based on the resonance period.

Further, the control device is configured to correct the target tilt angle such that a perpendicular passing through the estimated center of gravity passes within a range of a triangle formed by connecting grounding points of the left and right front wheels and a grounding point of the rear wheel when the perpendicular passes outside the range of the triangle.

According to the above configuration, when a vehicle is not traveling, the vehicle is vibrated by the vehicle tilting device so that the vehicle swingingly vibrates, and a height of the center of gravity of the vehicle is estimated based on a resonance period of the vibration of the vehicle. Therefore, when the vehicle is not traveling, a height of the center of gravity of the vehicle can be estimated.

According to the above configuration, whether or not correction of the target tilt angle is necessary is determined depending on whether or not a perpendicular passing through the estimated center of gravity passes within a range of a triangle. Therefore, it is possible to correct the target tilt angle of the vehicle based on the estimated height of the center of gravity from a time point when the vehicle starts traveling.

In one aspect of the present disclosure, the control device is configured to calculate, based on a resonance period, a spring constant of a swing vibration model of the vehicle in which a weight is fixed to an upper end of a cantilever fixed at a lower end, and to calculate a height of the center of gravity of the swing vibration model based on the spring constant to calculate a height of the center of gravity of the vehicle.

According to the above aspect, a spring constant of the swinging vibration model is calculated based on a resonance period, and a height of the center of gravity of the swinging vibration model is calculated based on the spring constant, whereby a height of the center of gravity of the vehicle is calculated. Therefore, a height of the center of gravity of the vehicle can be calculated by obtaining a resonance period of swinging vibration of the vehicle.

As will be described in detail later, an equation for calculating a spring constant of the swinging vibration model based on a resonance period and an equation for calculating a height of the center of gravity of the swinging vibration model based on the spring constant may be set, and a height of the center of gravity of the vehicle may be calculated by utilizing the equations. Also, by substituting the former equation into the latter equation, an equation for calculating a height of the center of gravity of the swinging vibration model based on a resonance period may be set, and a height of the center of gravity of the vehicle may be calculated by the equation.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

Figure 1:
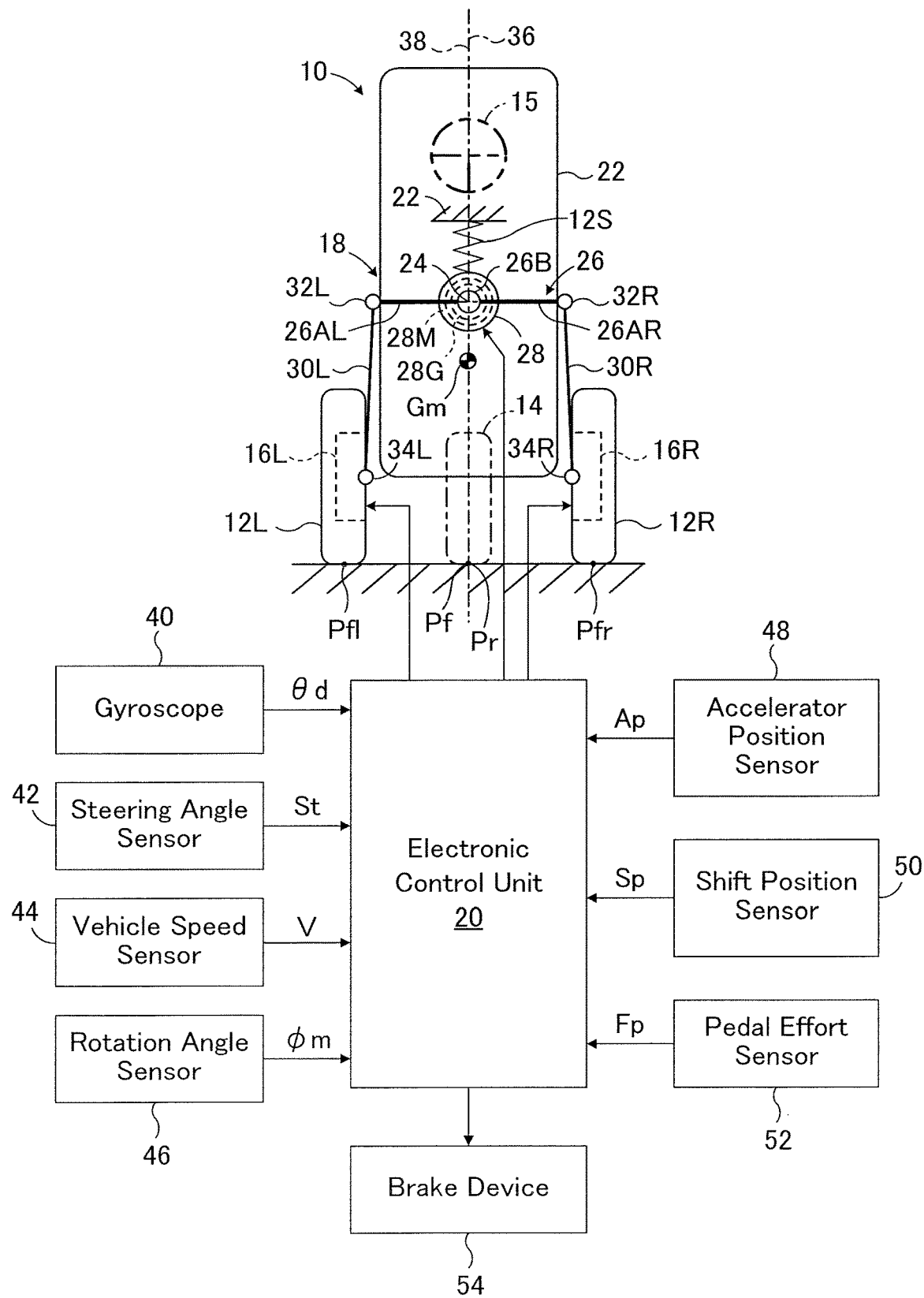
FIG. 1 is a schematic rear view showing an embodiment of an automatic tilting vehicle according to the present disclosure, taken along a vertical section at a front wheel position.
Figure 2:
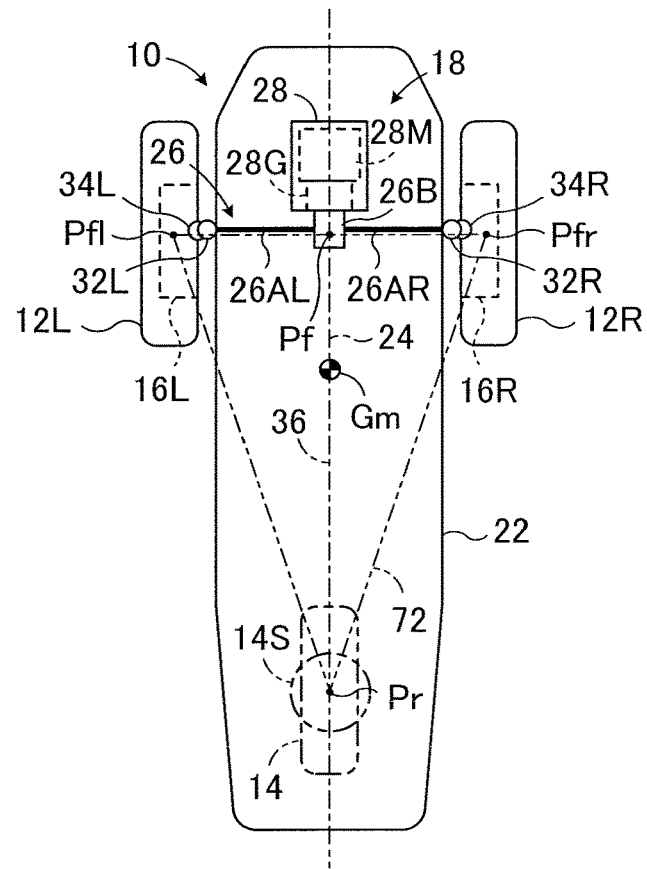
FIG. 2 is a schematic plan view showing the embodiment of the automatic tilting vehicle according to the present disclosure.
Figure 3:
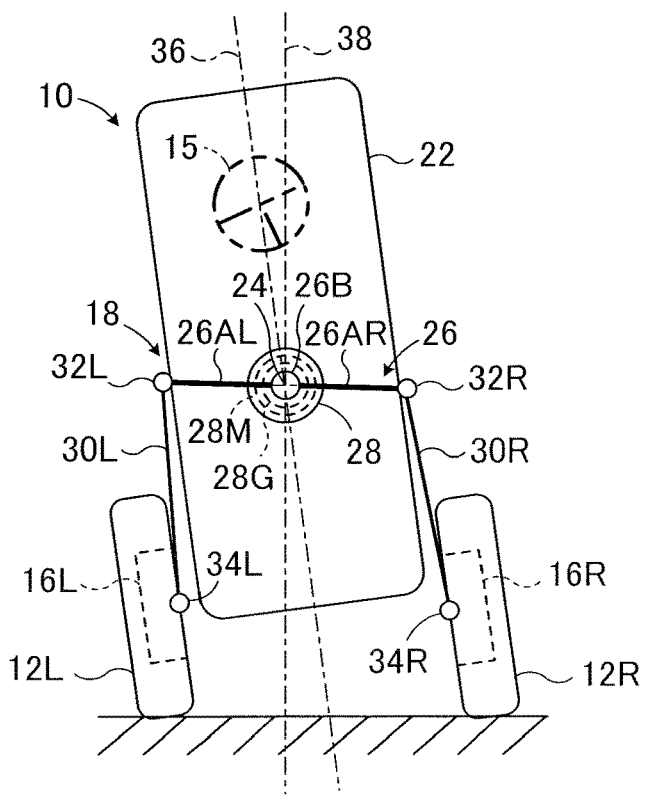
FIG. 3 is a rear view showing the embodiment at the time of left turning, taken along the vertical section at the front wheel position.

In FIGS. 1 and 2, an automatic tilting vehicle 10 according to an embodiment of the present disclosure is a three-wheeled vehicle with a riding capacity of three people that includes a pair of front wheels 12L and 12R which are non-steered driving wheels and a single rear wheel 14 which is a steering driven wheel. The front wheels 12L and 12R are spaced apart from each other in the lateral direction of the vehicle 10 and are rotatably supported by corresponding carriers 16L and 16R, respectively, about rotation axes (not shown). Although not shown in FIGS. 1 and 2, the rear wheel 14 is arranged to be steered by a steering mechanism according to an amount of operation of a steering wheel 15 by a driver. In FIGS. 1 and 3, the steering wheel 15 is shown in a position different from an actual position. The automatic tilting vehicle 10 further includes a vehicle tilting device 18 and an electronic control unit 20.

In the embodiment, although not shown in FIGS. 1 and 2, the carriers 16L and 16R incorporate in-wheel motors as driving devices. The carriers 16L and 16R are supported so as to be vertically displaceable with respect to a vehicle body 22 by corresponding suspension arms such as leading arms and to restrict lateral displacement with respect to the vehicle body 22.

The vehicle tilting device 18 includes a swing member 26 that swings about a swing axis 24 extending in the longitudinal direction of the vehicle, an actuator 28 that swings the swing member 26 about the swing axis 24, and a pair of tie rods 30L and 30R. The tie rods 30L and 30R extend substantially in the vertical direction on both lateral sides with respect to the swing axis 24 and are pivotally connected to the swing member 26 by joints 32L and 32R such as ball joints at the upper ends. Further, the tie rods 30L and 30R are pivotally connected to the corresponding carriers 16L and 16R by joints 34L and 34R such as ball joints at the lower ends, respectively.

The swing member 26 has a boss portion 26B rotatably supported about the swing axis 24 and arm portions 26AL and 26AR integrally formed with the boss portion 26B and extending in opposite directions from the boss portion 26B, and functions as a swing arm member that swings about the swing axis 24. The upper ends of the tie rods 30L and 30R are pivotally connected to the distal ends of the arm portions 26AL and 26AR, respectively.

A front wheel suspension 12S including a suspension spring and a shock absorber are interposed between the support member supporting the boss portion 26B and the actuator 28 and the vehicle body 22. Accordingly, the front wheels 12L, 12R and the vehicle tilting device 18 are suspended from the vehicle body 22 by the front wheel suspension 12S. The rear wheel 14 is suspended from the vehicle body 22 by a rear wheel suspension 14S including a suspension spring and a shock absorber. Therefore, the front wheels 12L, 12R and the rear wheel 14 can move upward and downward with respect to the vehicle body 22 together with the vehicle tilting device 18, and the relative vibration of them is attenuated by the shock absorber. It is to be noted that the front wheel suspension 12S is configured to prevent the vehicle tilting device 18 from inclining in the lateral direction with respect to the vehicle body 22.

The actuator 28 is a rotary type actuator and includes an electric motor 28M and a reduction gear device 28G. Rotational motion of a rotor of the electric motor 28M is decelerated by the reduction gear device 28G and is transmitted to the swing member 26. Note that the actuator 28 may be a reciprocating type actuator, and reciprocating motion of the actuator may be converted into a rotational motion by a motion converting mechanism and transmitted to the swing member 26.

As shown in FIG. 3, when the swing member 26 swings about the swing axis 24, the tie rods 30L and 30R vertically move in mutually opposite directions, so that the front wheels 12L and 12R vertically move in mutually opposite directions with respect to the vehicle body 22, whereby the vehicle 10 is inclined in the lateral direction. A rate of change of a tilt angle θ of the vehicle (an angle formed by a center plane 36 in the vertical direction of the vehicle 10 with respect to the vertical direction 38), that is, a tilt angular velocity θd of the vehicle is detected by a gyroscope 40. A signal indicating the tilt angular velocity θd of the vehicle detected by the gyroscope 40 is input to the electronic control unit 20.

The tilt angle θ becomes 0 when the swing angle of the swing member 26 is 0 and the center plane 36 coincides with the vertical direction 38 and assumes a positive value when the vehicle 10 is tilted so that the vehicle 10 is inclined to the left. Since the tilt angle θ of the vehicle 10 is substantially the same as a roll angle α, not shown, of the vehicle body 22, a roll angle α of the vehicle body may be detected by a roll angle sensor, and a roll angle α may be set as a tilt angle θ.

A steering angle St equal to a rotation angle of the steering wheel 15 is detected by a steering angle sensor 42. A signal indicating a steering angle St detected by the steering angle sensor 42 and a signal indicating a vehicle speed V detected by a vehicle speed sensor 44 are input to the electronic control unit 20. A signal indicating a rotation angle φm of the electric motor 28M detected by a rotation angle sensor 46 is also input to the electronic control unit 20. The rotation angle φm becomes 0 when the swing angle of the swing member 26 is 0, and assumes a positive value when the swing member 26 swings so that the vehicle 10 is tilted to the left as viewed from the rear of the vehicle.

A signal indicating an accelerator position Ap which is a depression operation amount of an accelerator pedal, not shown, operated by a driver is input from an accelerator position sensor 48 to the electronic control unit 20. A signal indicating a shift position Sp, which is an operation position of a shift lever, not shown, operated by the driver, is input from a shift position sensor 50 to the electronic control unit 20. Further, a signal indicating a pedaling force Fp to a brake pedal, not shown, by the driver is input from a pedal effort sensor 52 to the electronic control unit 20. The electronic control unit 20 controls driving forces of the front wheels 12L and 12R by controlling outputs and rotational directions of the in-wheel motors based on the accelerator position Ap and the shift position Sp. Further, the electronic control unit 20 controls a brake device 54 based on the pedaling force Fp, thereby controlling braking forces of the front wheels 12L, 12R and the rear wheel 14.

Figure 4:
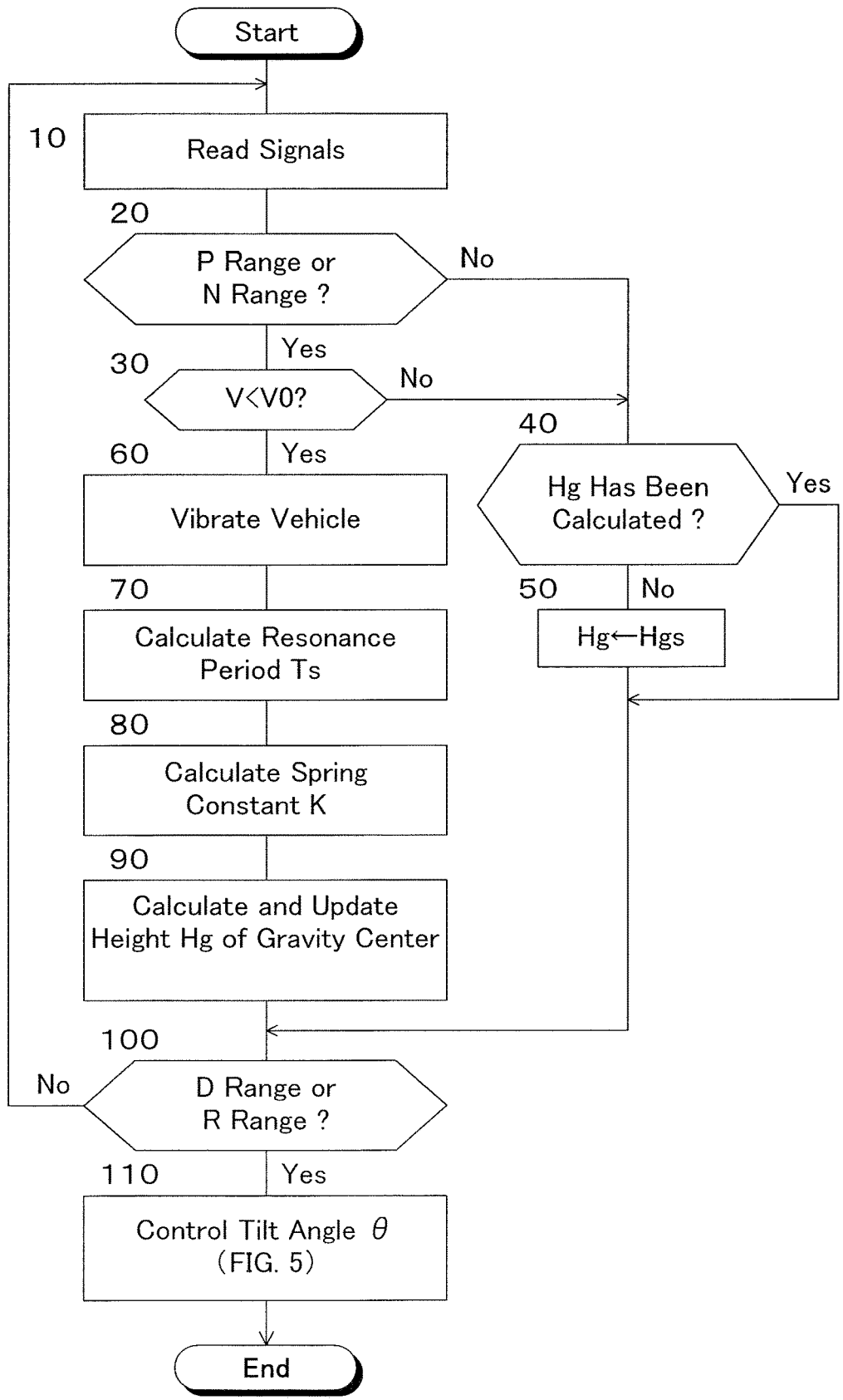
FIG. 4 is a flowchart showing a routine for estimating a height of a center of gravity of the vehicle and controlling a tilt angle of the vehicle in the embodiment.

The electronic control unit 20 tilts the vehicle 10 in the lateral direction by the vehicle tilting device 18 and abruptly releases the tilt in a state where the vehicle 10 is not substantially running, according to the flowchart shown in FIG. 4, so that the vehicle 10 is swingingly vibrated in the lateral direction. Further, the electronic control unit 20 calculates a resonance period Ts of the swinging vibration based on a change in the tilt angle θ of the vehicle 10; calculates a spring constant K of the swinging deformation of the vehicle 10 based on the resonance period Ts; and estimates a height Hg of the center of gravity Gm of the vehicle 10 based on the spring constant K.

Figure 5:
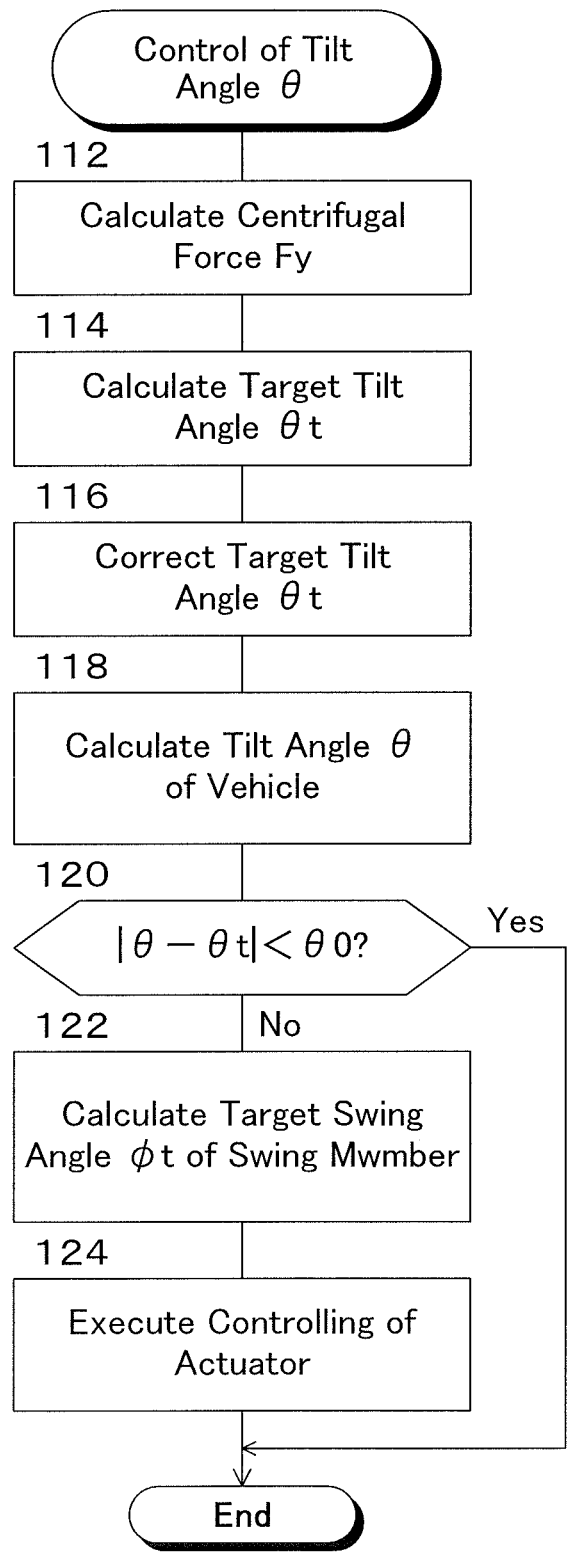
FIG. 5 is a flowchart showing a control routine of the tilt angle of the vehicle executed in step 110 of the flowchart shown in FIG. 4.

Further, the electronic control unit 20 calculates a target tilt angle θt of the vehicle 10 using the estimated height Hg of the center of gravity Gm according to the flowcharts shown in FIGS. 4 and 5, and controls a rotation angle φm of the electric motor 28 M of the actuator 28 so that a tilt angle θ of the vehicle conforms to the target tilt angle θt. Therefore, the electronic control unit 20 functions as a control unit configured to tilt the vehicle 10 in the lateral direction by controlling the swing angle φ of the swing member 26.

In FIG. 1, the electronic control unit 20 and sensors such as the gyroscope 40 are shown outside the vehicle 10, but are mounted on the vehicle 10. The electronic control unit 20 may comprise a microcomputer having, for example, a CPU, a ROM, a RAM, and an input/output port device, which are connected to each other by a bi-directional common bus. The control programs corresponding to the flowcharts shown in FIGS. 4 and 5 are stored in the ROM, and the tilt angle θ and the like of the vehicle 10 are controlled by the CPU according to the control programs. The ROM also stores a mass M (a positive constant) of the vehicle 10 and a standard value Hgs (a positive constant) of a height of the center of gravity Gm of the vehicle which are obtained in advance for the one occupant state. Furthermore, the microcomputer that performs the control according to the flowcharts shown in FIGS. 4 and 5 may be a microcomputer different from a microcomputer that controls the braking/driving forces of the wheels.

<Principle of Height Estimation of Center of Gravity of Vehicle>

Next, prior to describing the control executed according to the flowcharts shown in FIGS. 4 and 5, the principle for estimating a height Hg of the center of gravity G of the vehicle 10 adopted in the embodiment will be described.

When a tilting action by the vehicle tilting device 18 is abruptly released in a state where the vehicle 10 is tilted in the lateral direction by the vehicle tilting device 18, the vehicle 10 swingingly vibrates in the lateral direction around the vicinity of the midpoint of grounding points of the front wheels 12L and 12R. This vibration is free vibration (resonance vibration) of swing motion in the lateral direction, and its restoring force is thought to be generated by an elasticity of the vehicle body 22, elasticities of the suspensions of the front wheels and the rear wheel, and elasticities of tires of the front wheels 12L and 12R.

Figure 6:
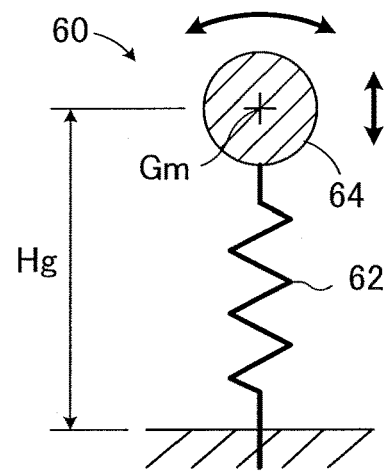
FIG. 6 is a diagram showing a vibration model of a vehicle according to the embodiment.
Figure 7:
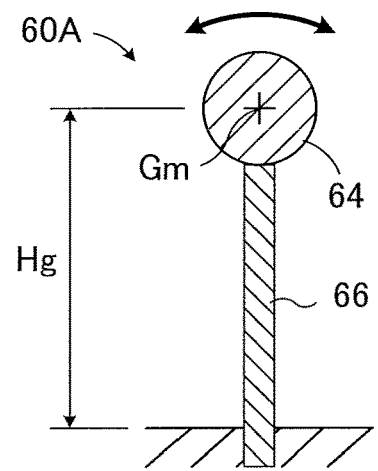
FIG. 7 is a diagram showing a swing vibration model of a vehicle according to the embodiment.
Figure 8:
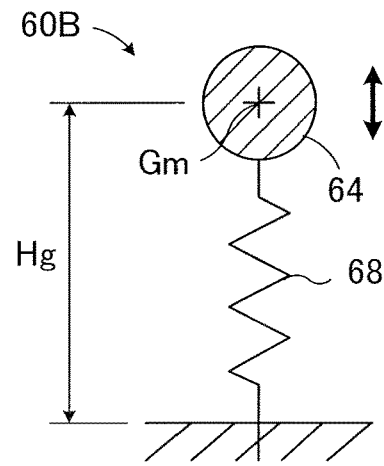
FIG. 8 is a diagram showing a simple harmonic vibration model of a vehicle of the embodiment.

Therefore, with respect to the free vibration of the swing motion, the vehicle 10 can be modeled by a vibration model 60 shown in FIG. 6. The vibration model 60 includes a spring 62 fixed at a lower end and a weight 64 fixed to an upper end of the spring 62. The spring 62 can be bent and deformed around the fixed portion to swingingly oscillate in the lateral direction and make a simple harmonic oscillation in the vertical direction. Therefore, the vibration of the vibration model 60 can be considered to be a combination of the swinging vibration of the swinging vibration model 60A shown in FIG. 7 and the simple harmonic vibration in the vertical direction of the simple harmonic vibration model 60B shown in FIG. 8.

The swinging vibration model 60A is a vibration model including a cantilever 66 fixed at a lower end and capable of being bent and deformed in the lateral direction by elasticity, and a weight 64 fixed to an upper end thereof. The simple harmonic vibration model 60B is a vibration model including a spring 68 fixed at a lower end and elastically deformable in the vertical direction and a weight 64 fixed to an upper end thereof. For simplicity, it is assumed that the masses of the spring 62, the cantilever 66 and the spring 68 are concentrated on the weight 64 so that the masses of the spring 62 etc. are zero.

A height of the center of gravity Gm of the vibration model 60, that is, a distance Hg between the fixed portion of the spring 62 and the center of gravity Gm of the vibration model 60 is related to a period of the swinging vibration of the swinging vibration model 60A, but has no relation to a period of the simple harmonic vibration of the simple harmonic vibration model 66B. Therefore, the height Hg of the center of gravity Gm can be derived by obtaining a period Ts of the swinging vibration for the swinging vibration model 60A.

Assuming that a Young's modulus and a geometrical moment of inertia of the cantilever 66 are respectively E [kN/mm$^2$] and I [mm] in the swinging vibration model 60A, a spring constant K [kN/mm] of the cantilever 66 is represented by the following equation (1). Therefore, a height Hg [mm] of the center of gravity Gm is expressed by the following equation (2).

$$K=3EI/Hg^3 \quad (1)$$

$$Hg=\sqrt[3]{K/3EI} \quad (2)$$

Assuming that a mass of the weight 64 is M [kg], a resonance period Ts [sec] is expressed by the following equation (3). Therefore, the spring constant K is expressed by the following equation (4). Notably, π in the following equations (3) and (4) is the circumference ratio.

$$Ts=2\pi\sqrt{M/K} \quad (3)$$

$$K=M(2\pi/Ts)^2 \quad (4)$$

Consequently, by obtaining a resonance period Ts based on the swinging vibration of the vibration model 60, especially the swinging vibration model 60A, a spring constant K can be calculated from the above equation (4), and by substituting this into the above equation (2), a height Hg of the center of gravity Gm can be calculated. Therefore, in the embodiment, a resonance period Ts is calculated on the basis of the change in the tilt angle θ of the vehicle 10 when the vehicle 10 is performing a free vibration of the swinging vibration in the lateral direction, and a height Hg of the center of gravity Gm of the vehicle 10 is calculated by the equations (4) and (2).

<Routine of Estimation of Height of Center of Gravity and Control of Tilt Angle of Vehicle>

Next, a routine for estimating a height of the center of gravity of the vehicle and controlling a tilt angle of the vehicle in the embodiment will be described with reference to the flowchart shown in FIG. 4. The control according to the flowchart shown in FIG. 4 is repeatedly executed at predetermined time intervals when an ignition switch, not shown, is on. In the following description, the estimation of a height of the center of gravity and the control of the tilt angle according to the flowchart shown in FIG. 4 are simply referred to as the control.

First, in step 10, a signal indicating a steering angle St detected by the steering angle sensor 42, and the like are read. Although not shown in FIG. 1, if a locking device for preventing swinging motion of the swinging member 26 when the vehicle tilting device 18 is not operated is provided, the locking of the locking device is released at the start of the control.

In step 20, it is determined whether or not a shift position Sp is in the non-driving range, that is, whether a shift position Sp is in P range or N range. When a negative determination is made, the control proceeds to step 40, and when an affirmative determination is made, the control proceeds to step 30.

In step 30, it is determined whether or not a vehicle speed V is smaller than a reference value V0 (a positive constant close to 0), that is, whether or not the vehicle 10 is substantially stopped. When an affirmative determination is made, the control proceeds to step 60, and when a negative determination is made, the control proceeds to step 40.

In step 40, it is determined whether or not calculation of a height Hg of the center of gravity Gm of the vehicle 10 has been completed. When an affirmative determination is made, the control proceeds to step 100, and when a negative determination is made, in step 50, the height Hg is set to a standard value Hgs stored in the ROM and is stored in the RAM, and subsequently, the control proceeds to step 100.

In step 60, the vehicle 10 is vibrated by the vehicle tilting device 18. That is, the vehicle 10 is inclined at a predetermined tilt angle in the lateral direction by the vehicle tilt device 18, and the tilt action by the vehicle tilt device 18 is abruptly released in this state, so that the vehicle 10 is excited to vibrate in the lateral direction around the vicinity of the midpoint between grounding points of the front wheels 12L and 12R. Note that an initial tilt direction for exciting the vehicle 10 may be either of left and right. Also, until a predetermined time has elapsed since the vehicle 10 was vibrated, the step 60 is skipped and the control is passed to the step 70 without the vehicle 10 being vibrated again.

In step 70, a time period during which the tilt angle θ of the vehicle 10 changes between a positive maximum value θp max and a negative minimum value θn max an absolute value of which is the maximum value is calculated, and twice the calculated time period is set to a resonance period Ts. Note that the resonance period Ts may be an average value of a plurality of calculated time periods.

In step 80, a spring constant K of the swinging deformation due to an elasticity of the vehicle 10 is calculated according to the equation (4) based on the resonance period Ts. In the equation (4), M is set to a mass M stored in the RAM, and when there is no value stored in the RAM, M is set to a mass M stored in the ROM.

In step 90, a height Hg of the center of gravity Gm of the vehicle 10 is calculated according to the above equation (2) and stored in the RAM. When a height Hg has already been calculated and stored in the RAM, the stored value is updated by being rewritten to the newly calculated value and stored in the RAM. The relationship between the height Hg and the mass M of the vehicle 10 obtained in advance through experiments or the like is stored in the ROM. A mass M of the vehicle 10 is calculated based on the calculated height Hg and is stored in the RAM. A Young's modulus E of the swing deformation due to an elasticity of the vehicle 10 and a geometrical moment of inertia I may be obtained in advance and stored in the ROM.

In step 100, it is determined whether or not the shift position Sp is the running range, that is, it is determined whether or not the shift position Sp is D range or R range. When a negative determination is made, the control returns to step 10, and when an affirmative determination is made, the control proceeds to step 110. Notably, in step 100, it may be determined whether or not the shift position Sp is the running range and whether or not a vehicle speed is equal to or greater than a reference value (a positive constant) for running determination.

In step 110, a target tilt angle θt of the vehicle 10 is calculated using the height Hg of the center of gravity Gm of the vehicle 10 stored in the RAM in accordance with the flowchart shown in FIG. 5, and a tilt angle θ of the vehicle is controlled so as to be the target tilt angle θt.

Next, the control routine of a tilt angle of the vehicle executed in step 110 will be described with reference to the flowchart shown in FIG. 5.

In step 112, an estimated lateral acceleration Gyh of the vehicle 10 is calculated on the basis of a steering angle St and a vehicle speed V in a manner known in the ar. Furthermore, a centrifugal force Fy acting on the center of gravity Gm of the vehicle 10 is calculated as a product of the estimated lateral acceleration Gyh and a mass M of the vehicle.

Figure 9:
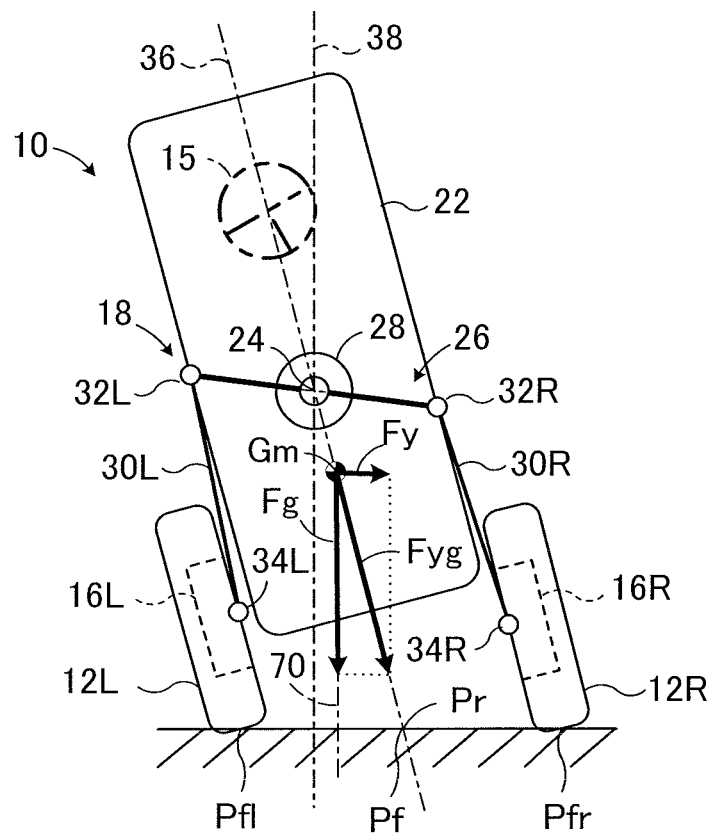
FIG. 9 is an explanatory view showing a manner of calculating a target tilt angle θt of a vehicle for tilting the vehicle to the inside of turning.

In step 114, a target tilt angle θt of the vehicle for tilting the vehicle 10 to the turning inner side is calculated. In this case, a target tilt angle θt of the vehicle is calculated so that, as shown in FIG. 9, a resultant force Fyg of a centrifugal force Fy and the gravity Fg acting on the center of gravity Gm of the vehicle 10 acts toward a line connecting a midpoint Pf between grounding points Pfr and Pfl of the front wheels 12L and 12R and a grounding point Pr of the rear wheel 14. It is to be noted that since a target tilt angle θt is determined by the gravity Fg and a centrifugal force Fy acting on the center of gravity Gm, a height Hg of the center of gravity does not affect proper calculation of a target tilt angle θt. Since the gravity Fg is a product of a mass M of the vehicle and the gravitational acceleration g, it is constant, whereas a magnitude of a centrifugal force Fy increases as an absolute value of an estimated lateral acceleration Gyh increases.

In step 116, if a perpendicular 70 passing through the center of gravity Gm passes outside the range of a triangle 72 (see FIG. 3) formed by connecting the grounding points Pfl, Pfr of the front wheels 12L, 12R and the grounding point Pr of the rear wheel 14, the target tilt angle θt of the vehicle is corrected so that the perpendicular 70 passes through the range of the triangle 72. That is, a magnitude of the target tilt angle θt is reduced. Notably, when the perpendicular 70 passes within the range of the triangle 72, the target tilt angle θt of the vehicle is not corrected.

In step 118, a signal indicating a tilt angular velocity θd of the vehicle 10 detected by the gyroscope 40 is read, and a tilt angle θ of the vehicle 10 is calculated by integrating the tilt angular velocity θd. When the gyroscope 40 outputs a signal indicating a tilt angle θ of the vehicle 10, an integration of a tilt angular velocity θd is unnecessary.

In step 120, it is determined whether or not an absolute value of a difference θ−θt between the tilt angle θ of the vehicle 10 and the target tilt angle θt of the vehicle is smaller than a reference value θ0 (a positive constant). When an affirmative determination is made, as it is not necessary to correct the tilt angle θ of the vehicle, the tilt angle control once ends, and when a negative determination is made, the tilt angle control proceeds to step 122.

In step 122, a target swing angle φt of the swing member 26 is calculated that is necessary to render a difference θ−θt between the tilt angle θ of the vehicle 10 and the target tilt angle θt of the vehicle to a value not more than the reference value θ0, and a target rotation angle φmt of the electric motor 28M of the actuator 28 is calculated that is necessary to achieve the target tilt angle φt.

In step 124, the electric motor 28M is controlled so that a rotation angle φm of the electric motor 28M conforms to the target rotation angle φmt, whereby the swing angle φ of the swing member 26 is controlled to the target swing angle φt.

As can be understood from the above descriptions, when it is determined that the vehicle 10 is substantially stopped in steps 20 and 30, in step 60, the vehicle 10 is excited to swingingly vibrate in the lateral direction by the vehicle tilting device 18. In step 70, a resonance period Ts of the swinging vibration of the vehicle 10 is calculated. In step 80, a spring constant K of the swinging deformation due to an elasticity of the vehicle 10 is calculated based on the resonance period Ts according to the above equation (4). Further, in step 90, a height Hg of the center of gravity Gm of the vehicle 10 is calculated according to the above equation (2), and is updated as necessary.

When the vehicle 10 is in a travelable state or running state, an affirmative determination is made in step 100. Therefore, in step 110, according to the flowchart shown in FIG. 5, a target tilt angle θt of the vehicle 10 is calculated and a tilt angle θ of the vehicle 10 is controlled so as to be the target tilt angle θt.

Specifically, in step 112, an estimated lateral acceleration Gyh of the vehicle 10 is calculated based on a steering angle St and a vehicle speed V, and a centrifugal force Fy acting on the center of gravity Gm of the vehicle is calculated as a product of the estimated lateral acceleration Gyh and the mass M of the vehicle. In step 114, the target tilt angle θt of the vehicle for tilting the vehicle 10 toward the turning inner side is calculated so that a resultant force Fyg of the centrifugal force Fy and the gravity Fg acting on the center of gravity Gm of the vehicle 10 acts in a predetermined direction. The target tilt angle θt of the vehicle is modified as necessary at step 116.

In step 118, a tilt angle θ of the vehicle 10 is calculated based on a tilt angular velocity θd of the vehicle 10 detected by the gyroscope 40. Further, in steps 120 to 124, the electric motor 28M of the actuator 28 is controlled so that a magnitude of the difference θ−θt between the tilt angle θ of the vehicle 10 and the target tilt angle θt is equal to or less than the reference value θ0, whereby a swing angle φ of the moving member 26 is controlled.

According to the embodiment, in a situation where the vehicle 10 is substantially stopped, the vehicle 10 is vibrated by the vehicle tilting device 18, and by calculating a resonance period Ts of the swinging vibration of the vehicle 10 and a spring constant K of the swinging deformation due to elasticity, a height Hg of the center of gravity Gm of the vehicle 10 is calculated and updated. Therefore, a height Hg of the center of gravity Gm can be estimated immediately before the vehicle starts traveling.

Further, according to the embodiment, by determining whether or not a perpendicular 70 passing through the center of gravity Gm the height Hg of which is estimated passes through the range of the triangle 72 formed by connecting grounding points of the three wheels, it is determined whether or not a correction of the target tilt angle θt is necessary. Therefore, the target tilt angle θt of the vehicle can be corrected based on the estimated height Hg of the center of gravity from a time point when the vehicle starts traveling.

Particularly, according to the embodiment, in a situation where the vehicle 10 is substantially stopped, the vehicle 10 is vibrated by the vehicle tilting device 18, and a height Hg of the center of gravity Gm of the vehicle 10 is calculated. Therefore, it is possible to calculate a height Hg of the center of gravity Gm without being affected by a disturbance input to the vehicle from a road surface through the wheels while the vehicle is traveling, and it is possible to properly correct the target tilt angle θt of the vehicle without being influenced by the disturbance.

Figure 10:
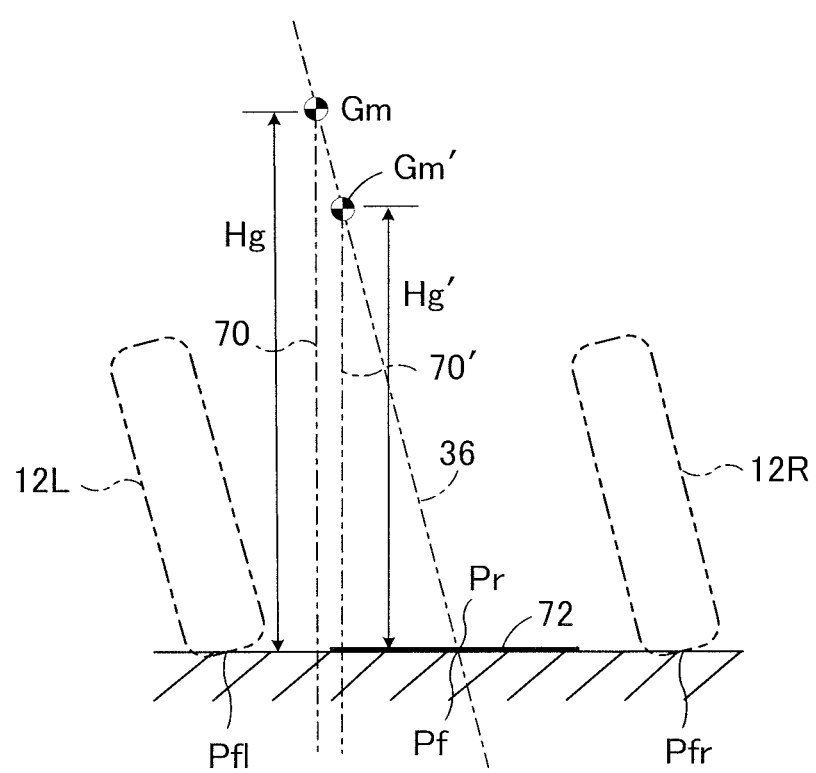
FIG. 10 is a view showing a state in which a perpendicular passing through a center of gravity Gm of an actual vehicle passes outside the triangle range connecting grounding points of the wheels, and a height Hg' of a preset center of gravity Gm' is smaller than an actual height Hg.

As shown in FIG. 10, it is assumed that in a situation where a perpendicular 70 passing through the center of gravity Gm of the actual vehicle passes outside the range of the triangle 72, a height Hg' of the preset center of gravity Gm' is smaller than an actual height Hg. When it is determined whether or not a correction of the target tilt angle θt is required based on the center of gravity Gm' having the preset height Hg', a perpendicular 70' passing through the center of gravity Gm' is determined to pass within the range of the triangle 72 and the target tilt angle θt of the vehicle 10 is not corrected, which may cause a possibility that the vehicle tends to fall over when the vehicle is stopped.

Figure 11:
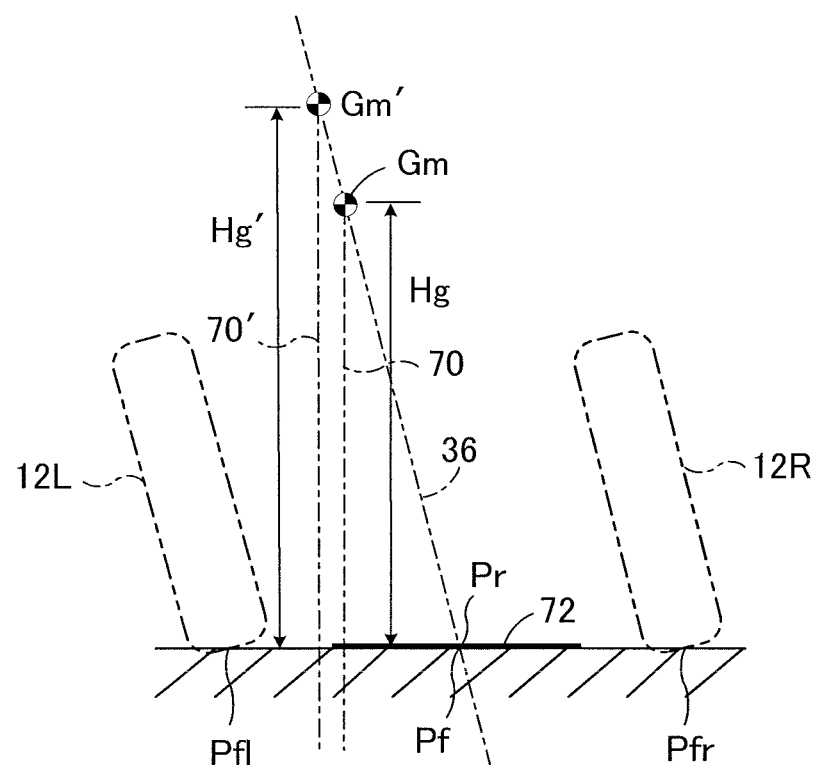
FIG. 11 is a view showing a state in which a perpendicular passing through the center of gravity Gm of an actual vehicle passes through a triangle range connecting the grounding points of the wheels, and the height Hg' of the preset center of gravity Gm' is larger than the actual height Hg.

In contrast, as shown in FIG. 11, it is assumed that in a situation where a perpendicular 70 passing through the center of gravity Gm of the actual vehicle passes within the range of the triangle 72, a height Hg' of the preset center of gravity Gm' is larger than an actual height Hg. When it is determined whether or not a correction of the target tilt angle θt is required based on the center of gravity Gm' having the preset height Hg', the magnitude of the target tilt angle θt of the vehicle 10 is unnecessarily reduced so that a perpendicular 70' passing through the center of gravity Gm' passes through the range of the triangle 72 by reducing the magnitude of the target tilt angle θt of the vehicle 10, which may cause a situation where the magnitude of the tilt angle θ of the vehicle is insufficient.

According to the embodiment, in a situation where the vehicle 10 is substantially stopped, a height Hg of the center of gravity Gm of the vehicle 10 is calculated and updated. Therefore, it is possible to reduce the possibility of occurrence of the above-described problems when the necessity of correction of the target tilt angle θt is determined based on a height Hg' of the preset center of gravity Gm'. That is, it is possible to reduce the possibility that the correction is not made despite the necessity of correcting the target tilt angle θt and the possibility that the correction of the target tilt angle θt is performed despite the correction is unnecessary.

According to the embodiment, in step 80, a mass M used when a spring constant K of the vehicle 10 is calculated based on a resonance period Ts is a mass M that is corrected in step 90 and stored in the RAM. Therefore, for example, a spring constant K of the vehicle 10 can be accurately calculated as compared to where a mass M set in advance as a constant is used.

In the above embodiment, a height Hg of the center of gravity Gm of the vehicle 10 is calculated and updated in a situation where the vehicle 10 is substantially stopped. Therefore, a height Hg of the center of gravity Gm is calculated and updated even when the vehicle stops in the course of traveling, such as signal waiting. Therefore, even when a mass of the whole vehicle and a height Hg of the center of gravity Gm change due to loading and unloading of loads while the vehicle is stopped and the ignition switch is on in the course of traveling, the target tilt angle θt can properly be corrected.

Furthermore, according to the embodiment, an excitation for swinging vibration of the vehicle 10 is performed by the vehicle tilting device 18 used for controlling the tilt angle θ of the vehicle, and a change of the tilt angle θ of the vehicle 10 that is used to calculate a resonance period Ts of the swinging vibration of the vehicle 10 is detected using the detection value of the gyroscope 40 used for controlling the tilt angle θ of the vehicle. Therefore, since vibratory excitation of the vehicle 10 and calculation of a height Hg of the center of gravity Gm are performed by using the devices installed in the vehicle 10, it is unnecessary to add any special device.

Although the present disclosure has been described in detail with reference to specific embodiment, it will be apparent to those skilled in the art that the present disclosure is not limited to the above-described embodiment, and various other embodiments are possible within the scope of the present disclosure.

For example, in the above-described embodiment, a height Hg of the center of gravity Gm of the vehicle 10 is calculated, and the target tilt angle θt of the vehicle 10 is corrected such that a perpendicular 70 passing through the center of gravity Gm passes within the range of the triangle 72. In correcting the target tilt angle θt, it is assumed that a position in the front-rear direction of the center of gravity Gm of the vehicle 10 is constant. However, a physique of a driver, a presence or absence and a weight of loaded load, and the like may be detected by, for example, a load sensor; a position in the front-rear direction of the center of gravity Gm may be estimated based on the detection results; and the target tilt angle θt may be corrected considering the position in the front-rear direction.

In the above-described embodiment, a resonance period Ts of the swinging vibration of the vehicle 10 is calculated; a spring constant K of the swinging deformation due to an elasticity of the vehicle 10 is calculated based on the resonance period Ts according to the above equation (4); and a height Hg of the center of gravity Gm of the vehicle 10 is calculated according to the above equation (2). However, a height Hg of the center of gravity Gm of the vehicle 10 may be calculated based on the resonance period Ts according to the following expression (5) obtained by substituting the above equation (4) into the above equation (2).

$$Hg = 3\sqrt{M/3EI(2\pi/Ts)^2} \qquad (5)$$

Further, in the above embodiment, when it is determined in step 40 that a height Hg of the center of gravity Gm has not yet been calculated, a height Hg of the center of gravity Gm is set to the standard value Hgs in step 50. However, at the start of the control, a height Hg of the center of gravity Gm may be set to the standard value Hgs prior to step 10, and steps 40 and 50 may be omitted.

In the above embodiment, the automatic tilting vehicle 10 has a capacity of one, but the number of occupants to which the present disclosure is applied may be two or more. In addition, the pair of front wheels 12L and 12R are non-steered drive wheels and the rear wheel 14 is a steered driven wheel. However, the front wheels 12L and 12R may be steered drive wheels and the rear wheels 14 may be non-steered driven wheels.

In the above embodiment, a centrifugal force Fy acting on the center of gravity Gm of the vehicle is calculated in step 112, and in step 114, a target tilt angle θt of the vehicle is calculated which is required to make a resultant force Fyg of the centrifugal force Fy and the gravity Fg acts in a predetermined direction. The predetermined direction is a direction in which the resultant force Fyg as seen in the longitudinal direction of the vehicle is directed to the midpoint of grounding points of the left and right front wheels. However, the predetermined direction may be a direction in which the resultant force Fyg as seen in the longitudinal direction of the vehicle is directed to a point within a predetermined range including the midpoint of the grounding points of the right and left front wheels. Further, since the target tilt angle θt is determined by the ratio between a lateral acceleration Gy of the vehicle 10 and the gravitational acceleration g and, accordingly, can be calculated based on a ratio between an estimated lateral acceleration Gyh and the gravitational acceleration g, the target tilt angle θt may be calculated according to, for example, the following equation (6).

$$\theta t = \arctan(Gyh/g) \quad (6)$$

In the above embodiment, the relationship between a height Hg and a mass M of the vehicle 10 obtained in advance through experiments or the like is stored in the ROM. In step 90, a mass M of the vehicle 10 is calculated based on a calculated height Hg of the center of gravity and stored in the RAM. However, the calculation of a mass M of the vehicle based on a height Hg of the center of gravity may be omitted.

Furthermore, in the above-described embodiment, the vehicle 10 is vibrated in the lateral direction by the vehicle tilting device 18. However, by applying a driving force to one of the front wheels and by applying a braking force to the other front wheel, or by applying a driving force to one of the front wheels in a state where a braking force is applied to the rear wheel, the vehicle may be vibrated by utilizing a vertical force applied to a wheel by a reaction force from a road surface.

What is claimed is:

1. An automatic tilting vehicle that comprises
left and right front wheels,
a rear wheel,
a vehicle body,
a vehicle tilting device that is configured to tilt the automatic tilting vehicle in a lateral direction,
a detection device that detects a tilt angle of the automatic tilting vehicle and
a control device configured to control the vehicle tilting device;
wherein
the left and right front wheels and the vehicle tilting device are suspended from the vehicle body by one front wheel suspension and the ar wheel is suspended from the vehicle body by a rear wheel suspension;
the control device is configured to calculate a target tilt angle of the automatic tilting vehicle to a turning inner side so that a resultant force of gravity and a centrifugal force acting on a center of gravity when turning is directed to a predetermined position between grounding points of the left and right front wheels as seen in a longitudinal direction of the automatic tilting vehicle and to control the vehicle tilting device so that the tilt angle of the automatic tilting vehicle conforms to the target tilt angle;
the control device is configured to tilt the automatic tilting vehicle in the lateral direction by the vehicle tilting device, to swingingly vibrate the automatic tilting vehicle in the lateral direction by tilting the automatic tilting vehicle by the vehicle tilting device and releasing the tilting of the automatic tilting vehicle when the automatic tilting vehicle is not traveling, to obtain a resonance period of swinging vibration of the automatic tilting vehicle based on a change in the tilt angle of the automatic tilting vehicle detected by the detection device, and to estimate a height of the center of gravity of the automatic tilting vehicle based on the resonance period; and
the control device is configured to correct the target tilt angle such that a perpendicular passing through the estimated height of the center of gravity passes within a range of a triangle formed by connecting grounding points of the left and right front wheels and a grounding point of the rear wheel when the perpendicular passes outside the range of the triangle.

2. The automatic tilting vehicle according to claim 1, wherein the control device is configured to calculate, based on the resonance period, a spring constant of a swing vibration model of the automatic tilting vehicle in which a weight is fixed to an upper end of a cantilever fixed at a lower end, and to estimate the height of the center of gravity of the automatic tilting vehicle based on the calculated spring constant.

* * * * *